(12) United States Patent
Zhang et al.

(10) Patent No.: US 10,545,362 B2
(45) Date of Patent: Jan. 28, 2020

(54) DISPLAY DEVICE

(71) Applicants: BOE Technology Group Co., Ltd., Beijing (CN); Hefei BOE Display Lighting Co., Ltd., Hefei, Anhui (CN)

(72) Inventors: Qiping Zhang, Beijing (CN); Wenbo Sun, Beijing (CN)

(73) Assignees: BOE Technology Group Co., Ltd., Beijing (CN); Hefei BOE Display Lighting Co., Ltd., Hefei (CN)

( * ) Notice: Subject to any disclaimer, the term of this patent is extended or adjusted under 35 U.S.C. 154(b) by 0 days.

(21) Appl. No.: 15/994,288

(22) Filed: May 31, 2018

(65) Prior Publication Data

US 2019/0064586 A1 Feb. 28, 2019

(30) Foreign Application Priority Data

Aug. 23, 2017 (CN) .......................... 2017 1 0729087

(51) Int. Cl.
*G02F 1/1333* (2006.01)
*G02F 1/1335* (2006.01)
*F21V 8/00* (2006.01)

(52) U.S. Cl.
CPC ..... *G02F 1/133308* (2013.01); *G02B 6/0025* (2013.01); *G02B 6/0031* (2013.01); *G02F 1/133528* (2013.01)

(58) Field of Classification Search
CPC ......... G02F 1/133528; G02F 1/133308; G02F 1/133608; G02F 2001/133311;
(Continued)

(56) References Cited

U.S. PATENT DOCUMENTS

2008/0018826 A1\* 1/2008 Bae .................... G02F 1/133308
349/58
2011/0273906 A1\* 11/2011 Nichol ................. G02B 6/0076
362/607
(Continued)

FOREIGN PATENT DOCUMENTS

| CN | 1963622 A | 5/2007 |
| CN | 205080336 U | 3/2016 |
| CN | 106022324 A | 10/2016 |

OTHER PUBLICATIONS

Chinese Office Action for Chinese Application No. 201710193999.X dated Jan. 11, 2019.

*Primary Examiner* — Shan Liu
(74) *Attorney, Agent, or Firm* — Arent Fox LLP; Michael Fainberg (57) ABSTRACT

The disclosure discloses a display device. The display device with a display area, and a bezel area surrounding the display area includes a back plate, and a light guiding plate and an optical film arranged above the back plate in that order, wherein a display panel is further arranged above the optical film, and the display panel is supported and fixed by a frame arranged above the back plate, and located on a periphery of the light guiding plate and the optical film; and there is an adhesive coating layer arranged on such a part of a surface of the optical film facing the display panel that overlaps with the bezel area, and an adhesion coefficient of an adhesive material of the adhesive coating layer reduces as a temperature rises.

7 Claims, 5 Drawing Sheets

(58) Field of Classification Search
CPC ........ G02F 2001/133314; G02F 2001/133317;
G02F 2001/13332; G02F 2001/133322;
G02F 2001/133325; G02F 2001/133328;
G02F 2001/133331; G02F 2001/133334;
G02F 1/1336; G02F 2001/133607; G02F
2001/133616; G02F 1/133606; G02F
1/133504; G02F 2202/28; G02F
1/133615; G02B 6/0031; G02B 6/0025;
G02B 6/0011; G02B 6/0013; G02B
6/0015; G02B 6/0016; G02B 6/0018;
G02B 6/002; G02B 6/0021; G02B
6/0023; G02B 6/0026; G02B 6/0028;
G02B 6/003; G02B 6/0088
USPC .............................................. 349/58–65, 122
See application file for complete search history.

(56) References Cited

U.S. PATENT DOCUMENTS

| | | | | |
|---|---|---|---|---|
| 2015/0277181 A1* | 10/2015 | Onishi | ............... | G02F 1/134336 |
| | | | | 349/59 |
| 2015/0362775 A1* | 12/2015 | Shimokawa | ...... | G02F 1/133308 |
| | | | | 349/12 |
| 2016/0291404 A1* | 10/2016 | Kim | ................... | G02F 1/133528 |
| 2017/0045774 A1* | 2/2017 | Yoshikawa | ........... | G02F 1/1333 |
| 2018/0274740 A1* | 9/2018 | Watanabe | ................. | F21K 9/20 |
| 2018/0355216 A1* | 12/2018 | Ahn | ........................ | C08L 33/08 |

\* cited by examiner

DISPLAY DEVICE

CROSS-REFERENCE TO RELATED APPLICATION

This Application claims priority to Chinese Patent Application No. 201710729087.X, filed on Aug. 23, 2017, the content of which is incorporated by reference in the entirety.

TECHNICAL FIELD

This disclosure relates to the field of display technologies, and particularly to a display device.

DESCRIPTION OF THE RELATED ART

A Liquid Crystal Display (LCD) with the advantages of low radiation, a small volume, low energy consumption, etc., has gradually taken the place of a traditional Cathode Ray Tube (CRT) display in some applications, and thus has been widely applied to a notebook computer, a Personal Digital Assistant (PDA), a flat panel TV set, a mobile phone, and other products.

The liquid crystal display includes a display panel and a backlight module, and the backlight module is a component configured to provide the liquid crystal display product with a light source, and typically arranged below the display panel to provide uniformly emanative light rays at some brightness to the display panel.

Typically a shading tape is peripherally arranged on edges of the backlight module in the related art to shield light rays on the edges so as to prevent light from emitting from the edges on one hand, and to fix the display panel located on the backlight module on the other hand. And in general, a finished display device further needs to undergo high-temperature, high-humidity, and other reliability tests, and an optical component in the backlight module of the display device tends to expand or be shifted in the high-temperature and high-humidity test environment, so that the shading tape in contact with the optical component may float, thus resulting in a wavy wrinkle of an image being displayed by a resulting display device.

SUMMARY

Embodiments of the disclosure provide a display device.

In an aspect, embodiments of the disclosure provide a display device with a display area and a bezel area surrounding the display area, wherein the display device includes a back plate, and a light guiding plate and an optical film arranged above the back plate in that order, wherein a display panel is further arranged above the optical film, and the display panel is supported and fixed by a frame arranged above the back plate and located on a periphery of the light guiding plate and the optical film; and there is an adhesive coating layer arranged on such a part of a surface of the optical film facing the display panel that overlaps with the bezel area, and an adhesion coefficient of an adhesive material of the adhesive coating layer reduces as a temperature rises.

In some embodiments, there is a side light source arranged in a sub-bezel area on a side of the display device, and the adhesive coating layer is arranged in other sub-bezel areas of the display device than a sub-bezel area opposite to the sub-bezel area where the side light source is located.

In some embodiments, there is a shading tape affixed throughout the bezel area on a surface of the display panel facing the optical film, and a surface of the adhesive coating layer facing away from the optical film comes in contact with the shading tape.

In some embodiments, a first edge of the shading tape is not bonded with the display panel, and other edges of the shading tape than the first edge has a part bonded with the display panel and the adhesive coating layer, and a part bonded with the display panel and the frame; wherein the first edge of the shading tape is an edge of the shading tape proximate to the side light source.

In some embodiments, there is a gap area between the optical film and the frame, and the adhesive coating layer extends to the gap area.

In some embodiments, the display panel includes: an array substrate and a color filter substrate arranged opposite to each other, a lower polarizer arranged on a surface of the array substrate facing away from the color filter substrate, and an upper polarizer arranged on a surface of the color filter substrate facing away from the array substrate, and there are such a part of a surface of the array substrate facing the lower polarizer that overlaps with the lower polarizer in the bezel area, and such a part thereof that does not overlap with the lower polarizer; and the shading tape has a part contacted with the part of the array substrate, which does not overlap with the lower polarizer, and a part contacted with the lower polarizer.

In some embodiments, a material of the adhesive coating layer is melamine formaldehyde resin.

In some embodiments, the optical film includes a lower diffusion sheet, and a lower light enhancement sheet, an upper light enhancement sheet, and an upper diffusion sheet arranged above the lower diffusion sheet in that order, and the upper diffusion sheet comes into contact with the adhesive coating layer.

In some embodiments, a reflection sheet is further arranged between the light guiding plate and the back plate.

In some embodiments, the back plate is a U-shaped back plate.

BRIEF DESCRIPTION OF THE DRAWINGS

In order to make the technical solutions according to embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

Figure 1:
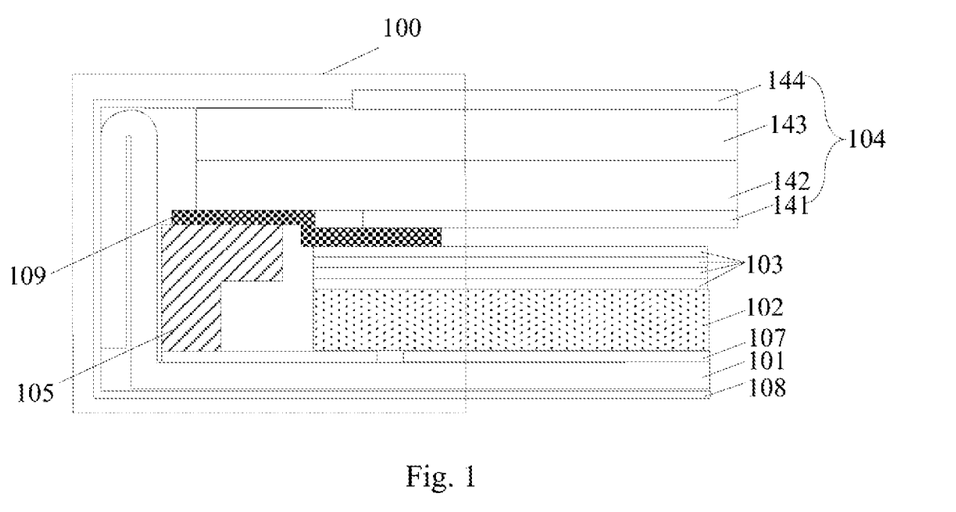
FIG. 1 is a schematic structural diagram of a display device in a related art in a top view.

As illustrated in FIG. 1, a display device in the related art includes a reflection sheet 107, a light guiding plate 102, an optical film 103, and a display panel 104, arranged above a back plate 101 in that order, where a frame 105 is further arranged on a periphery of the light guiding plate 102 and the optical film 103, and a shading tape is arranged between the display panel 104, and the frame 105 and the optical film 103. However in this display device, on one hand, in order to facilitate assembling, typically some distance is reserved between the frame 105, and the light guiding plate 102 and the optical film 103; and on the other hand, the finished display device further needs to undergo high-temperature, high-humidity, and other reliability tests, and the optical film tend to expand in the high-temperature and high-humidity test environment. In both of the cases, the optical components (e.g., the light guiding plate 102 and the optical film 103) in the display device may expand or be shifted, so that the shading tape in contact with the optical components may float, thus resulting in a wavy wrinkle of an image being displayed by a resulting display device.

Embodiments of the disclosure provide a display device so as to address the problem in the related art of a wavy wrinkle of an image being displayed by the display device due to an optical component thereof being shifted or expanding.

Implementations of the embodiments of the disclosure will be described below in details with reference to the drawings. It shall be noted that identical or like reference numbers will represent identical or like elements, or elements with identical or like functions throughout the drawings. The embodiments to be described below with reference to the drawings are exemplary, and merely intended to illustrate the disclosure, but not to limit the disclosure thereto.

Figure 2:
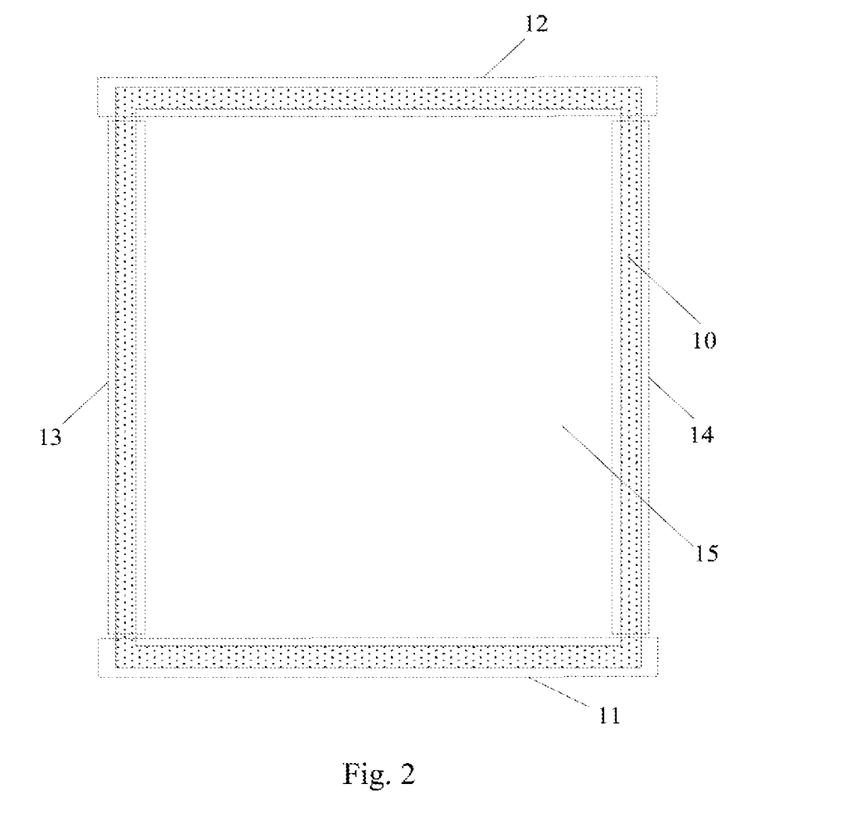
FIG. 2 is a schematic structural diagram of a display device according to the embodiments of the disclosure in a top view.

The embodiments of the disclosure provide a display device, and as illustrated in FIG. 2, which illustrates a schematic structural diagram thereof in a top view, the display device includes a display area 15, and a bezel area 10 surrounding the display area 15. In some embodiments, the display device is generally shaped as a square, and for example, the bezel area 10 includes four sub-bezel areas, which are a first sub-bezel area 11, a second sub-bezel area 12 opposite to the first sub-bezel area 11, and a third sub-bezel area 13 and a fourth sub-bezel area 14, both of which connect with the first sub-bezel area 11 and the second sub-bezel area 12, respectively, where the display area 15 is surrounded by the four sub-bezel areas.

Figure 3:
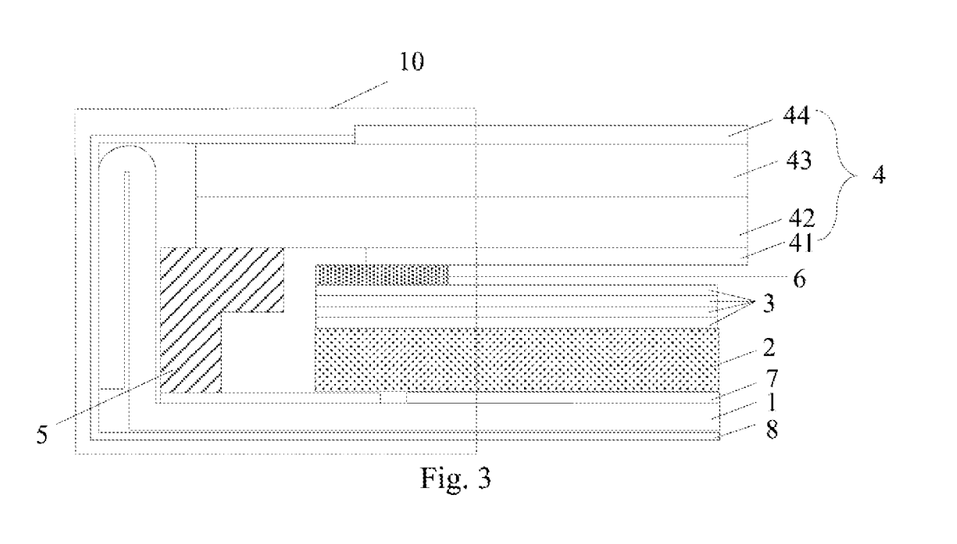
FIG. 3 is a schematic structural diagram of a display device according to the embodiments of the disclosure in a sectional view.
Figure 4:
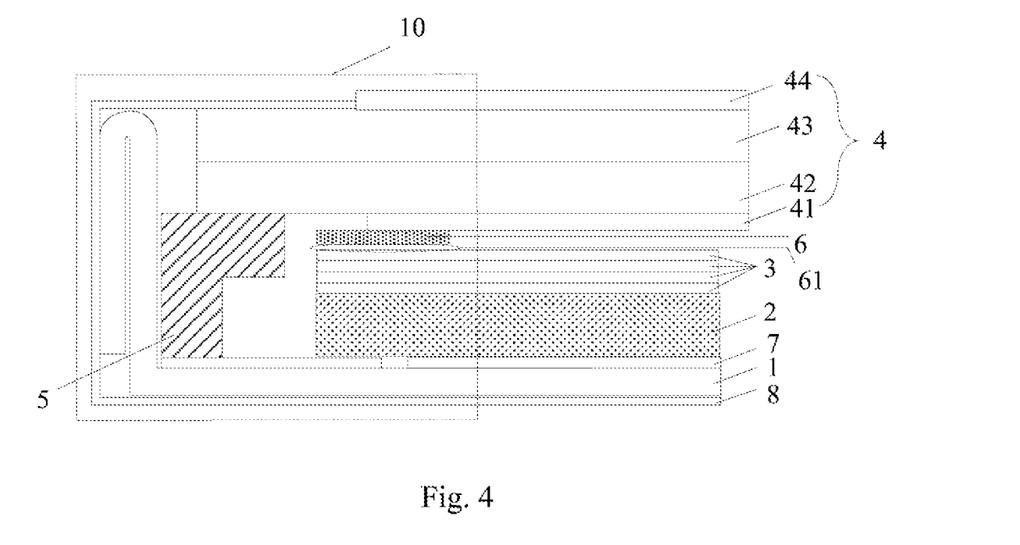
FIG. 4 is a schematic structural diagram of a display device with an optical film, being separated from an adhesive coating layer according to the embodiments of the disclosure.

As illustrated in FIG. 3, which illustrates a schematic structural diagram of the display device in a sectional view, the display device includes in a vertical direction: a back plate 1, and a light guiding plate 2 and an optical film 3 arranged above the back plate 1 in that order, where a display panel 4 is further arranged above the optical film 3, the display panel 4 is supported and fixed by a frame 5 arranged above the back plate 1, and located on a periphery of the light guiding plate 2 and the optical film 3. And there is an adhesive coating layer 6 arranged on such a part of a surface of the optical film 3 facing the display panel 4 that overlaps with the bezel area, and an adhesion coefficient of an adhesive material of the adhesive coating layer 6 reduces as a temperature rises, so that the adhesive coating layer 6 bonds the optical film 3 with the display panel 4 at a temperature lower than a preset temperature, and separates the optical film 3 from the display panel 4 at a temperature greater than or equal to the preset temperature. And as illustrated in FIG. 4, when the temperature is greater than or equal to the preset temperature, the adhesive coating layer 6 separates the optical film 3 from the display panel 4, thus resulting in a gap 61 between them.

In some embodiments, a reflection sheet 7 is further arranged between the light guiding plate 2 and the back plate 1. An adhesive tape 8 for fixing a liquid crystal screen is further arranged on an outside of the back plate 1. The back plate 1 is a U-shaped back plate. And a tip of the frame 5 is opposite to the display panel 4.

It shall be noted that for the display device, the display panel 4 is typically supported and fixed by the frame 5 arranged on an edge of the back plate 1, and the light guiding plate 2 and the optical film 3 are typically located above and supported by the back plate 1, but in order to prevent the light guiding plate 2 and the optical film 3 from being shifted, the optical film 3 located above the back plate 1 is typically bonded and fixed with the display panel 4 using the adhesive tape in the bezel area of the display device in the related art. However in the display device in the related art, when the optical film 3 is bonded and fixed with the display panel 4 using the adhesive tape, and the display device is further placed in a high-temperature and high-humidity test environment, the optical film 3 expands so that the adhesive tape floats, thus resulting in a wavy wrinkle of an image being displayed by the display device. In the embodiments of the disclosure, the adhesive coating layer 6 is arranged on such a part of the surface of the optical film 3 facing the display panel 4 that overlaps with the bezel area 10, and the adhesion coefficient of the adhesive material of the adhesive coating layer 6 reduces as the temperature rises, so that the optical film 3 can be bonded with the display panel 4 at a normal temperature, and the optical film 3 can be separated from the display panel 4 at a high temperature, thus avoiding the problem that a part of the optical component in the display device may expand in the high-temperature and high-humidity test environment so that there may be a wavy wrinkle of an image being displayed by the display device.

Figure 5:
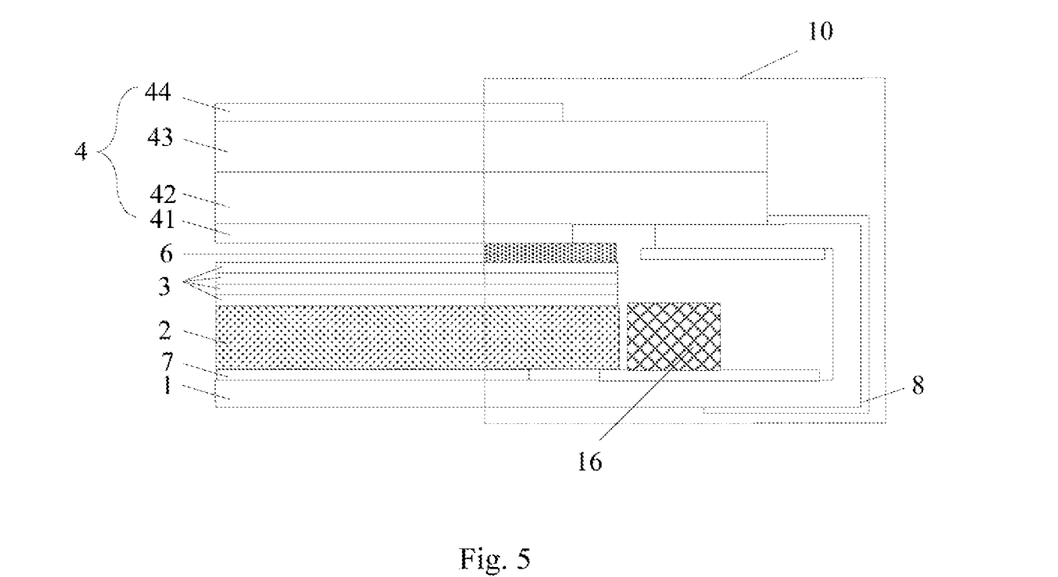
FIG. 5 is a schematic structural diagram of a display device arranged with a side light source according to the embodiments of the disclosure in a sectional view.
Figure 6:
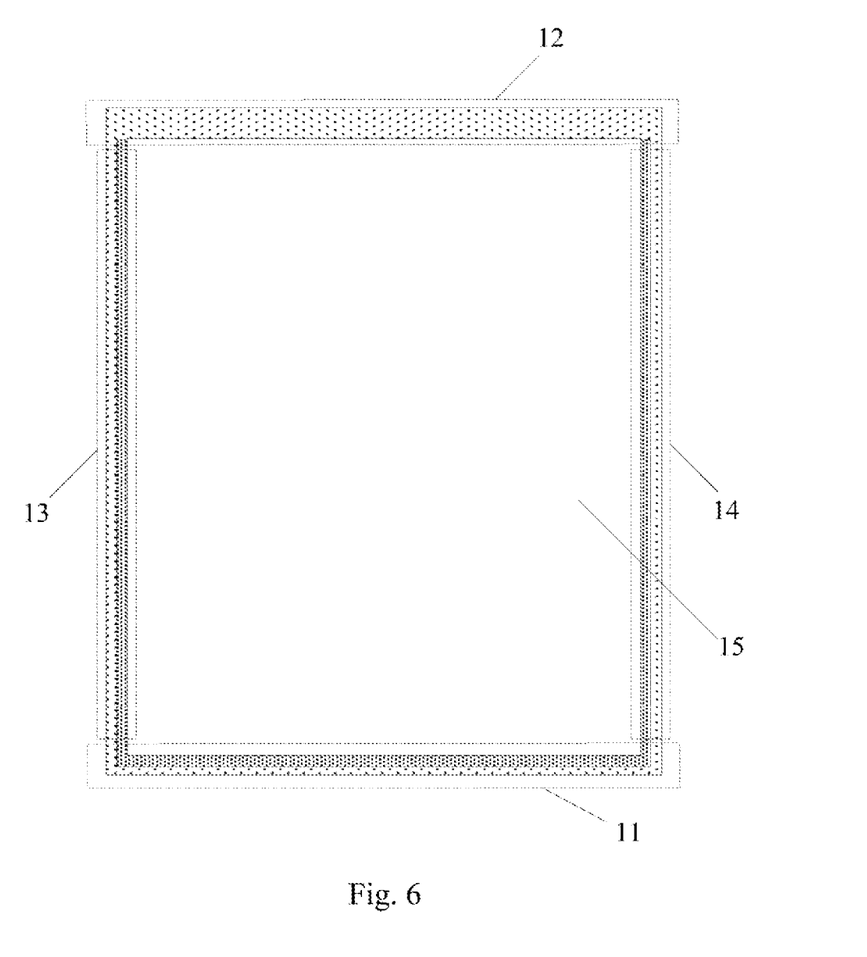
FIG. 6 is a schematic structural diagram of a display device with an adhesive coating layer arranged in a bezel area other than a second sub-bezel area according to the embodiments of the disclosure.

In some embodiments, as illustrated in FIG. 5 and FIG. 6, there is a side light source 16 arranged in a sub-bezel area on a side of the display device (e.g., the first sub-bezel area 11 in FIG. 6), and FIG. 5 is a schematic structural diagram of the display device in the first sub-bezel area in a sectional view, so the adhesive coating layer is arranged in other sub-bezel areas of the display device than a sub-bezel area opposite to the sub-bezel area where the side light source is located. For example, the side light source 16 is arranged in the first sub-bezel area 11 of the display device, and a sub-bezel area opposite to the first sub-bezel area 11 is taken as the second sub-bezel area 12, so the adhesive coating layer is arranged in other sub-bezel areas of the display device than the second sub-bezel area 12. Stated otherwise, in order to avoid the optical film from being completely separated from the display panel in the high-temperature and high-humidity test environment, the adhesive coating layer is arranged in part of the bezel area. In some embodiments, the adhesive coating layer is arranged in the other sub-bezel areas than the sub-bezel area opposite to the sub-bezel area where the side light source is arranged, that is, if the side light source is arranged in the first sub-bezel area 11, and the second sub-bezel area 12 is a sub-bezel area opposite to the sub-bezel area where the side light source is arranged, then the adhesive coating layer 6 is coated in the first sub-bezel area 11, the third sub-bezel area 13, and the fourth sub-bezel area 14 of the display device, thus resulting in a U-shaped adhesive coating layer. Stated otherwise, bonding and fixing is still made in the second sub-bezel area 12 using a general adhesive tape as arranged in the display device in the related art. Further, it shall be noted that, the adhesive coating layer 6 can alternatively be arranged throughout the bezel area.

Figure 7:
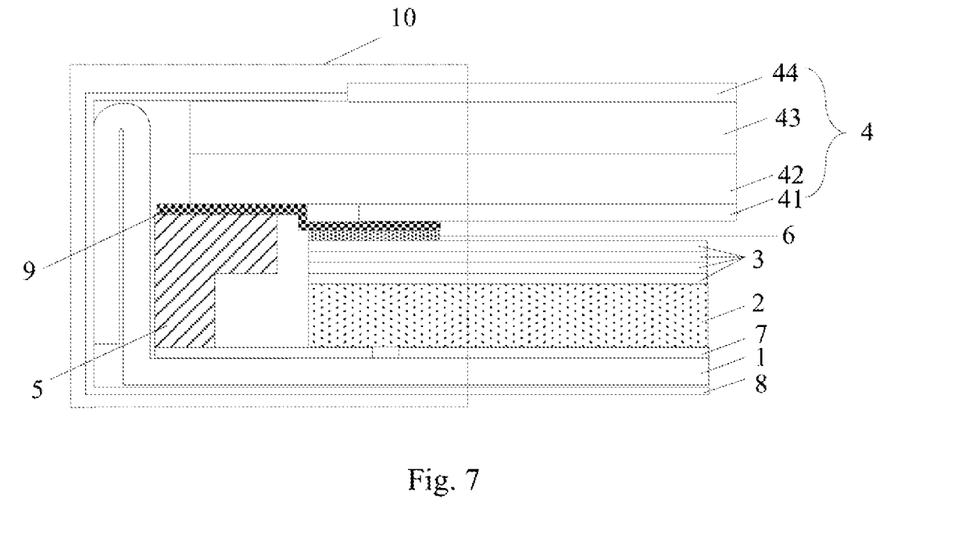
FIG. 7 is a schematic structural diagram of a display device arranged with a shading tape according to the embodiments of the disclosure in a sectional view.

As illustrated in FIG. 7, there is a shading tape 9 affixed throughout the bezel area on a surface of the display panel 4 facing the optical film 3, and a surface of the adhesive coating layer 6 facing away from the optical film 3 comes in contact with the shading tape 9. In some embodiments, the shading tape 9 in the other sub-bezel areas than the sub-bezel area where the side light source is arranged (e.g., the first sub-bezel area 11) is a double-sided shading tape, where a part of the double-sided shading tape comes into contact with the frame 5 to fix and connect the display panel 4 with the frame 5, and the other part thereof is opposite to the optical film 3. Stated otherwise, in some embodiments, the shading tape 9 is arranged throughout the bezel area 10 on the surface of the display panel 4 facing the optical film 3. And in order to remove a failing display element for replacement, typically the shading tape 9 in the first sub-bezel area 11 (on a lower side as illustrated in FIG. 6) is designed as a single-sided tape, that is, a surface of the shading tape 9 in the first sub-bezel area 11 facing away from the optical film 3 is designed without any adhesive, while the shading tape 9 in all the second sub-bezel area 12, the third sub-bezel area 13, and the fourth sub-bezel area 14 is a double-sided shading tape. Where a surface of the double-sided shading tape facing away from the optical film 3 comes into contact with the display panel 4, and a part of a surface of the double-sided shading tape facing the optical film 3 that is opposite to the frame 5 comes into direct contact with the frame 5 to fix and connect the display panel 4 with the frame 5, and the other part thereof is opposite to the optical film 3, and further comes into contact, and is fixed, with the optical film 3 after the adhesive coating layer is arranged therein. Stated otherwise, a first edge of the shading tape 9 is not bonded with the display panel 4, and the other edges of the shading tape 9 than the first edge has a part bonded with the display panel 4 and the adhesive coating layer 6, and a part bonded with the display panel 4 and the frame 5; wherein the first edge of the shading tape 9 is an edge of the shading tape 9 proximate to the side light source 16. Further, for a bezel area arranged with the adhesive coating layer 6, the adhesive coating layer 6 is arranged on the surface of the shading tape 9 facing the optical film 3, and comes into contact with the surface of the optical film 3, no matter whether the shading tape is a single-sided tape or a double-sided tape. In the embodiments of the disclosure, the adhesive coating layer 6 is arranged on the shading tape 9, so that the problem that a wavy wrinkle of an image being displayed by the display device due to the optical film being shifted or expanding can be addressed in the simplest fabrication process while providing light-shielding and fixing functions in the bezel area as required in the related art.

Figure 8:
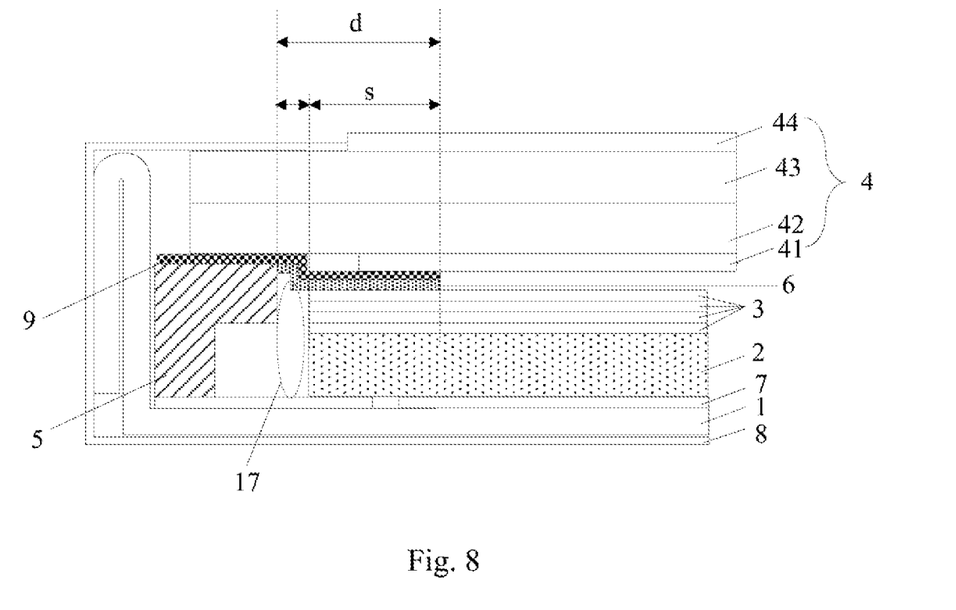
FIG. 8 is a schematic structural diagram of another display device arranged with a shading tape according to the embodiments of the disclosure in a sectional view.

As illustrated in FIG. 8, in some embodiments, there is a gap area 17 between the optical film 3 and the frame 5, and the adhesive coating layer 6 extends to the gap area 17. The gap area 17 means the optical film 3 and the frame 5 is spaced apart, the gap area is able to be at least partially filled with any gas or other materials, especially transparent insulating material. That is, the adhesive coating layer 6 includes a portion corresponding to the optical film 3 and a portion corresponding to the gap area 17; and in order to facilitate the fabrication, the adhesive coating layer corresponding to the optical film 3, and the adhesive coating layer corresponding to the gap area 17 are formed integrally. Stated otherwise, in the embodiments of the disclosure, in view of some operating space for the shading tape 9 in the assembling process, and also in order to avoid an adhesive area of the shading tape 9 from being adhered to an edge of the optical film 3 during extreme assembling, a width of the adhesive coating layer 6 shall be slightly larger in a direction from the display area to the bezel area. In some embodiments, since there is a unilateral width 0.1 mm of the operating space for the shading tape 9 in the assembling process, the width of the shading tape is d=s+0.3 mm in the direction from the display area to the bezel area, where s is a width of an area of the optical film in the bezel area that overlaps with the display panel. Since the frame 5 is made of a block material with less expansion in a high-temperature and high-humidity test, and the display area 4 generally needs to be supported and fixed by the frame 5, a part of the shading tape 9 corresponding to the gap area 17 is further arranged with the adhesive coating layer 6, and a part of the shading tape 9 opposite to the frame 5 is not arranged with the adhesive coating layer 6.

In some embodiments, the display panel 4 further includes: an array substrate 42 and a color filter substrate 43 arranged opposite to each other, a lower polarizer 41 arranged on a surface of the array substrate 42 facing away from the color filter substrate 43, and an upper polarizer 44 arranged on a surface of the color filter substrate 43 facing away from the array substrate 42, where there are such a part of a surface of the array substrate 42 facing the lower polarizer 41 that overlaps with the lower polarizer 41 in the bezel area, and such a part thereof that does overlap with the lower polarizer 41; and the shading tape 9 has a part contacted with the part of the array substrate 42, which does not overlap with the lower polarizer 41, and a part contacting with the lower polarizer 41. Stated otherwise, an area of the lower polarizer 41 is less than an area of the array substrate 42, and the adhesive coating layer 6 comes into contact with the lower polarizer 41 of the display panel 4.

In some embodiments, the optical film 3 includes a lower diffusion sheet, and a lower light enhancement sheet, an upper light enhancement sheet, and an upper diffusion sheet arranged above the lower diffusion sheet in that order, where the upper diffusion sheet comes into contact with the adhesive coating layer.

In some embodiments, a material of the adhesive coating layer 6 is melamine formaldehyde resin. A physical characteristic of the material is weakly adhesive (the adhesion coefficient thereof is approximately 500 g/25 mm) at normal temperature, and the adhesion coefficient thereof reduces as the temperature rises, where the adhesion coefficient reduces to approximately 1/10 of the original adhesion coefficient, i.e., 50 g/25 mm, at 80° C. to 100° C.

Advantageous effects of the embodiments of the disclosure are as follows: the adhesive coating layer is arranged on such a part of the surface of the optical film facing the display panel that overlaps with the bezel area, and the adhesion coefficient of the adhesive material of the adhesive coating layer reduces as the temperature rises, so that the optical film can be bonded with the display panel at normal temperature, and the optical film can be separated from the display panel at high temperature; and since no optical component will be bonded and confined by the adhesive coating layer in the high-temperature and high-humidity environment, the problem that a wavy wrinkle of an image being displayed by the display device due to the optical film being shifted or expanding can be addressed.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A display device with a display area, and a bezel area surrounding the display area, wherein the display device comprises a back plate, and a light guiding plate and an optical film arranged above the back plate in that order, wherein a display panel is further arranged above the optical film, and the display panel is supported and fixed by a frame arranged above the back plate and located on a periphery of the light guiding plate and the optical film; and a surface of the optical film facing the display panel is arranged with an adhesive coating layer at a part that overlaps with the bezel area, and wherein an adhesion coefficient of an adhesive material of the adhesive coating layer is reduced as a temperature rises, wherein a side light source is arranged in a sub-bezel area on a side of the display device, and the adhesive coating layer is arranged in sub-bezel areas of the display device other than a sub-bezel area opposite to the sub-bezel area where the side light source is located;

wherein a shading tape is affixed throughout the bezel area on a surface of the display panel facing the optical film, and a surface of the adhesive coating layer facing away from the optical film comes into contact with the shading tape; and wherein a first edge of the shading tape is a single sided adhesive member and having a surface without any adhesive facing the display panel, and edges of the shading tape other than the first edge are double sided adhesive members having a part directly adhered to the display panel and the adhesive coating layer and another part directly adhered to the display panel and the frame, and wherein the first edge of the shading tape is an edge of the shading tape in the sub-bezel area where the side light source is located.

2. The display device according to claim 1, wherein a gap area is located between the optical film and the frame, and the adhesive coating layer extends to the gap area.

3. The display device according to claim 1, wherein the display panel comprises: an array substrate and a color filter substrate arranged opposite to each other, a lower polarizer arranged on a surface of the array substrate facing away from the color filter substrate, and an upper polarizer arranged on a surface of the color filter substrate facing away from the array substrate, and a surface of the array substrate facing the lower polarizer has a first part that overlaps with the lower polarizer in the bezel area, and a second part that does not overlap with the lower polarizer in the bezel area; and wherein, the shading tape has a first part in contact with the second part of the array substrate that does not overlap with the lower polarizer, and a second part in contact with the lower polarizer.

4. The display device according to claim 1, wherein a material of the adhesive coating layer is melamine formaldehyde resin.

5. The display device according to claim 1, wherein the optical film comprises a lower diffusion sheet, and a lower light enhancement sheet, an upper light enhancement sheet, and an upper diffusion sheet arranged above the lower diffusion sheet in that order, and the upper diffusion sheet comes into contact with the adhesive coating layer.

6. The display device according to claim 1, wherein a reflection sheet is further arranged between the light guiding plate and the back plate.

7. The display device according to claim 1, wherein the back plate is a U-shaped back plate.

* * * * *